United States Patent
Steiner

(10) Patent No.: US 12,102,196 B2
(45) Date of Patent: Oct. 1, 2024

(54) FINGER RING WITH MAGNET FOR HOLDING AN ELECTRONIC DEVICE

(71) Applicant: Mark T. Steiner, Greenwich, CT (US)

(72) Inventor: Mark T. Steiner, Greenwich, CT (US)

(73) Assignee: CRESCENT RINGS, LLP, Greenwich, CT (US)

( * ) Notice: Subject to any disclaimer, the term of this patent is extended or adjusted under 35 U.S.C. 154(b) by 8 days.

(21) Appl. No.: 17/881,903

(22) Filed: Aug. 5, 2022

(65) Prior Publication Data

US 2023/0042081 A1 Feb. 9, 2023

Related U.S. Application Data

(60) Provisional application No. 63/229,637, filed on Aug. 5, 2021.

(51) Int. Cl.
*A45F 5/10* (2006.01)
*A44C 9/00* (2006.01)
*F16M 13/04* (2006.01)

(52) U.S. Cl.
CPC .......... *A44C 9/0061* (2013.01); *F16M 13/04* (2013.01); *A45F 2200/0516* (2013.01)

(58) Field of Classification Search
CPC ................. A44C 9/0061; F16M 13/04; A45F 2200/0516; A45F 5/10; F16B 2200/83
USPC ........................................ 224/217, 183, 930
See application file for complete search history.

(56) References Cited

U.S. PATENT DOCUMENTS

| | | | | |
|---|---|---|---|---|
| 7,374,142 B2 * | 5/2008 | Carnevali | ............. | F16M 13/00 224/183 |
| 9,966,771 B2 * | 5/2018 | Cross | ..................... | H02J 7/0047 |
| 10,561,209 B1 * | 2/2020 | Huynh | ................. | A44C 9/0061 |
| 10,616,388 B1 * | 4/2020 | Lee | ........................ | A45C 11/00 |
| 10,973,310 B2 * | 4/2021 | Vlassis | .................. | A45F 5/022 |
| 2015/0216285 A1 * | 8/2015 | Grainger | ............. | A44C 9/0069 206/581 |
| 2016/0045019 A1 * | 2/2016 | Srey | ........................ | A45F 5/00 294/65.5 |

FOREIGN PATENT DOCUMENTS

AT        16225 U1 *    4/2019

OTHER PUBLICATIONS

WO 2013057162 with translation (Year: 2019).*
AT 16225 with Translation (Year: 2019).*

* cited by examiner

*Primary Examiner* — Adam J Waggenspack
(74) *Attorney, Agent, or Firm* — Jacob M. Ward; Ward Law Office LLC

(57) ABSTRACT

An article of jewelry configured to secure a handheld, mobile electronic device. The article of jewelry includes a shank configured to hold the article of jewelry on a finger of a user and opposing shoulders extending from the shank. A setting extends from the opposing shoulders and has a receptacle. A magnet is positioned within the receptacle and is configured to engage a ferromagnetic structure of a handheld, mobile electronic device in a manner such as to secure the handheld, mobile electronic device to a finger of the user.

14 Claims, 5 Drawing Sheets

FINGER RING WITH MAGNET FOR HOLDING AN ELECTRONIC DEVICE

CROSS-REFERENCE TO RELATED APPLICATIONS

This application claims the benefit of U.S. Provisional Application No. 63/229,637 filed on Aug. 5, 2021. The entire disclosure of the above application is incorporated herein by reference.

FIELD

The present invention relates to accessories for handheld, mobile electronic devices, and more particularly, to a device for supporting a handheld, mobile electronic device in a hand of a user.

INTRODUCTION

The statements in this section merely provide background information related to the present disclosure and may not constitute prior art.

Handheld, mobile electronic devices can include cell phones, tablets, video devices, iPads, pagers, personal navigation devices, cameras and the like. With the prevalent use of handheld, mobile electronic devices in an electronic world and with handheld, mobile devices increasing in size, there is a need to secure the handheld, mobile electronic device to a hand of the user.

It is common for a user to drop the handheld, mobile electronic device as is proven with the rise of the cell phone repair industry. To help prevent the damage to a dropped handheld, mobile electronic device, users will often purchase a fitted protective case made from rubber, plastic or fabric-based material. Although these protective cases can prevent scratching or breakage to a handheld, mobile electronic device, they don't always prevent the user from dropping the handheld, mobile electronic device.

There are and have been products on the commercial market that attach to a case of a handheld, mobile electronic device to help prevent dropping. Users often complain of the obtrusive features of the products presently on the market. They are bulky and prevent the user from placing the handheld, mobile electronic device in their pocket, most have movable parts that make them obtrusive when storing in a purse and all obscure the streamline design of the fitted case or the slim features of a handheld, mobile electronic device.

Accordingly, there is a continuing need for a device that secures a handheld, mobile electronic device to a hand of a user.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the finger ring with magnet for holding an electronic device.

The above objects as well as other objects not specifically enumerated are achieved by an article of jewelry configured to secure a handheld, mobile electronic device. The article of jewelry includes a shank configured to hold the article of jewelry on a finger of a user and opposing shoulders extending from the shank. A setting extends from the opposing shoulders and has a receptacle. A magnet is positioned within the receptacle and is configured to engage a ferromagnetic structure of a handheld, mobile electronic device in a manner such as to secure the handheld, mobile electronic device to a finger of the user.

The above objects as well as other objects not specifically enumerated are achieved by a kit configured to secure an article of jewelry to a handheld, mobile electronic device. The kit includes an article of jewelry having a shank configured to hold the article of jewelry on a finger of a user, opposing shoulders extending from the shank, a setting extending from the opposing shoulders, the setting having a receptacle, and a magnet positioned within the receptacle. A ferromagnetic structure is associated with the handheld, mobile electronic device and configured for engagement with the magnet of the article of jewelry. The magnet is configured to engage the ferromagnetic structure in a manner such as to secure the handheld, mobile electronic device to the finger of the user.

The above objects as well as other objects not specifically enumerated are achieved by a method of securing a handheld, mobile electronic device to an article of jewelry. The method includes the steps of forming an article of jewelry having a shank configured to hold the article of jewelry on a finger of a user, opposing shoulders extending from the shank, a setting extending from the opposing shoulders, the setting having a receptacle, and a magnet positioned within the receptacle, associating a ferromagnetic structure with the handheld, mobile electronic device, the ferromagnetic structure configured for engagement with the magnet of the article of jewelry and engaging the ferromagnetic structure with the magnet in a manner such as to secure the handheld, mobile electronic device to the finger of the user.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes of selected embodiments and not all possible implementations, and are not intended to limit the scope of the present disclosure.

DETAILED DESCRIPTION

Figure 1:
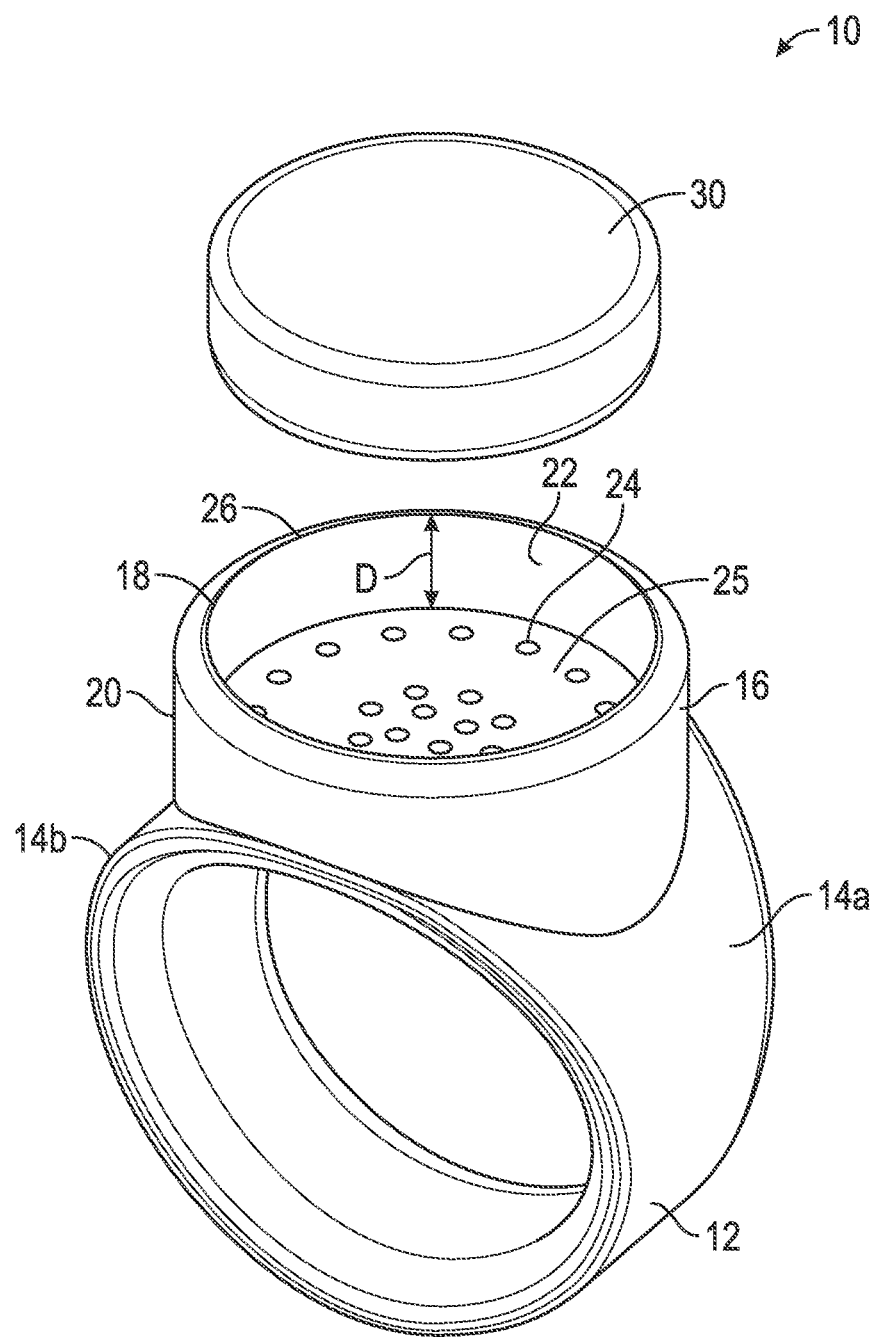
FIG. 1 is an exploded top perspective view of an article of jewelry according to a first embodiment of the present disclosure.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed, unless expressly stated otherwise. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

In accordance with the illustrated embodiments of the present disclosure, a novel device that secures a handheld, mobile electronic device to a hand of a user, has surprisingly been discovered. Non-limiting examples of handheld, mobile electronic device can include cell phones, tablets, video devices, iPads, pagers, personal navigation devices, cameras and the like. Generally, the invention includes a wearable magnet worn by the user and a ferromagnetic structure associated with a handheld, mobile electronic device. The ferromagnetic structure can be formed integral to a protective cover of the handheld, mobile electronic device or the ferromagnetic structure can be a discrete element incorporated into an assembly formed by the handheld, mobile electronic device and a protective cover. In the illustrated embodiment, the wearable magnet is coupled to an article of jewelry. The article of jewelry with the coupled magnet can be worn by the user and attaches to a ferromagnetic structure associated with the handheld, mobile electronic device. The attraction of the wearable magnet with the ferromagnetic structure is configured to secure the handheld, mobile electronic device to the hand of a user.

Referring now to FIG. 1, an article of jewelry 10 is shown. In the illustrated embodiment, the article of jewelry 10 has the form of a finger ring. However, it should be appreciated that in other embodiments, the article of jewelry 10 can have other forms, including the non-limiting examples of broches, bracelets, necklaces and the like.

Referring again to FIG. 1, the article of jewelry 10 includes a shank 12 (also commonly called a band), opposing shoulders 14a, 14b and a setting 16.

Referring again to FIG. 1, the shank 12 is configured to hold the article of jewelry 10 on the finger (not shown) of the user. The shank 12 can have any desired size, cross-sectional shape and can be formed from any desired material or combinations of materials. The size of the shank 12 is typically sized to the user's finger. Non-limited examples of suitable cross-sectional shapes include circular and D-shaped. Non-limiting examples of shank materials include, gold, sterling silver, titanium, zirconium, tungsten, steel, polymer, rubber and the like.

Referring again to FIG. 1, the opposing shoulders 14a, 14b extend from the shank 12 to the setting 16 and are configured to secure the setting 16 in place. In certain embodiments, the opposing shoulders 14a, 14b can have the same size, cross-section shape and can be formed from the same materials as is used to form the shank 12, although in other embodiments the opposing shoulders 14a, 14b and the shank 12 can be different sizes, cross-sectional shape and can be formed from different materials or combinations of materials.

Referring again to FIG. 1, the setting 16 extends from the opposing shoulders 14a, 14b and includes a receptacle 18. The receptacle 18 is defined by a circumferential wall 20 having an inner surface 22 and a floor 24. The inner surface 22 and the floor 24 define a cavity 25 formed within the receptacle 18. In the illustrated embodiment, the cavity 25 has a circular cross-sectional shape. In other embodiments, the cavity 25 can have other cross-sectional shapes, including the non-limiting examples of square, ovular and triangular cross-sectional shapes.

Referring again to FIG. 1, the circumferential wall 20 has an outer rim 26. A distance D) is formed from the floor 24 to the outer rim 26. The distance D1 will be discussed in more detail below.

Referring again to FIG. 1, a magnet 30 is positioned within the cavity 25 and secured to the floor 24 of the receptacle 18. The magnet 30 has a size and cross-sectional shape that approximates the size and cross-sectional shape of the cavity 25. The magnet 30 has a height H. In the illustrated embodiment, the height H of the magnet 30 is the same as, or more than the distance D formed from the floor 24 to the outer rim 26 of the receptacle 18. As will be explained in more detail below, the height H of the magnet 30, at the same vertical level as the distance D of the outer rim 26, provides maximum magnetic attractive power.

Referring again to FIG. 1, in certain embodiments, the receptacle 18, circumferential wall 20 and/or the floor 24 of the article of jewelry 10 is formed from materials or combinations of materials that incorporate ferromagnetic metals. The term "ferromagnetic structure", as used herein, is defined to mean any structure having ferromagnetic materials that exhibit a spontaneous net magnetization at the atomic level, even in the absence of an external magnetic field. These materials, when placed in an external magnetic field, are strongly magnetized in the direction of the field and are strongly attracted to the magnet 30.

Advantageously, the use of ferromagnetic materials allows the magnet 30 to form a magnetic bond with and attach to the receptacle 18, circumferential wall 20 and/or the floor 24 without the use of adhesives or structural attachment mechanisms. Examples of suitable ferromagnetic metals include iron, cobalt, steel, nickel, manganese, gadolinium, and lodestone. In other embodiments, the receptacle 18, circumferential wall 20 and/or the floor 24 of the article of jewelry 10 can be formed from other, non-magnetic materials, such as the non-limiting example of polymeric materials. In these embodiments, the magnet 30 is bonded within the cavity 25 and to the floor 24 with adhesives. In certain embodiments, a floor covering, such as the non-limiting example of a plastic base (not shown for purposes of clarity) may be disposed within the cavity 25 and configured to cover the floor 24. However, it should be appreciated that the floor covering is optional and not required for operation of the article of jewelry 10.

Referring again to FIG. 1, in certain embodiments, the floor 24 of the receptacle 18 can include certain floor features 32 configured to improve the bonding of the magnet 30 to the floor 24. Non-limiting examples of suitable floor features 32 include depressions, projections, cross-hatchings, combinations thereof and the like. The floor features 32 can be arranged in any desirable patterns or spacings sufficient to improve the bonding of the magnet 30 to the floor 24. However, it should be appreciated that the floor features 32 are optional and not required for operation of the article of jewelry 10.

While the embodiment of the article of jewelry 10 shown in FIG. 1 is described above as having a shank 12, opposing shoulders 14a, 14b and a setting 16, in other embodiments, the article of jewelry can have other structures, components and assemblies sufficient for the functions described herein.

Referring again to FIG. 1, the magnet 30 is formed from a combination of rare earth magnetic materials, metal alloy materials or combinations of metal alloy materials. One non-limiting example of a suitable rare earth magnetic material is the neodymium block magnet model number BX028, marketed by K&J Magnetics Inc., headquartered in Pipersville, Pa., although other magnets can be used. Acceptable metal alloy materials include neodymium iron boron (Nd—Fe—B), samarium cobalt (SmCo5 or Sm2Co17) and aluminum nickel cobalt (AlNiCo), although other metal alloys can be used. In the illustrated embodiment, the magnet 30 has a pull force in a range of from about 5.0 lbs to about 15.0 lbs and a surface field in a range of from about 4,000 Gauss to about 8,000 Gauss. However, in other embodiments, the magnet 30 can have a pull force less than about 5.0 lbs or more than about 15.0 lbs and a surface field less than about 4,000 Gauss or more than about 8,000 Gauss, sufficient for the functions described herein.

Referring again to the embodiment shown in FIG. 1, a lone magnet 30 is seated in the cavity 25 of the receptacle 18. It should be appreciated that in other embodiments, a plurality of magnets can be seated in the cavity 25 of the receptacle 18. It should also be appreciated that in other embodiments, the receptacle 18 can include a plurality of cavities, each defined by a wall and wherein one or more magnets can be positioned in the plurality of cavities.

Figure 2:
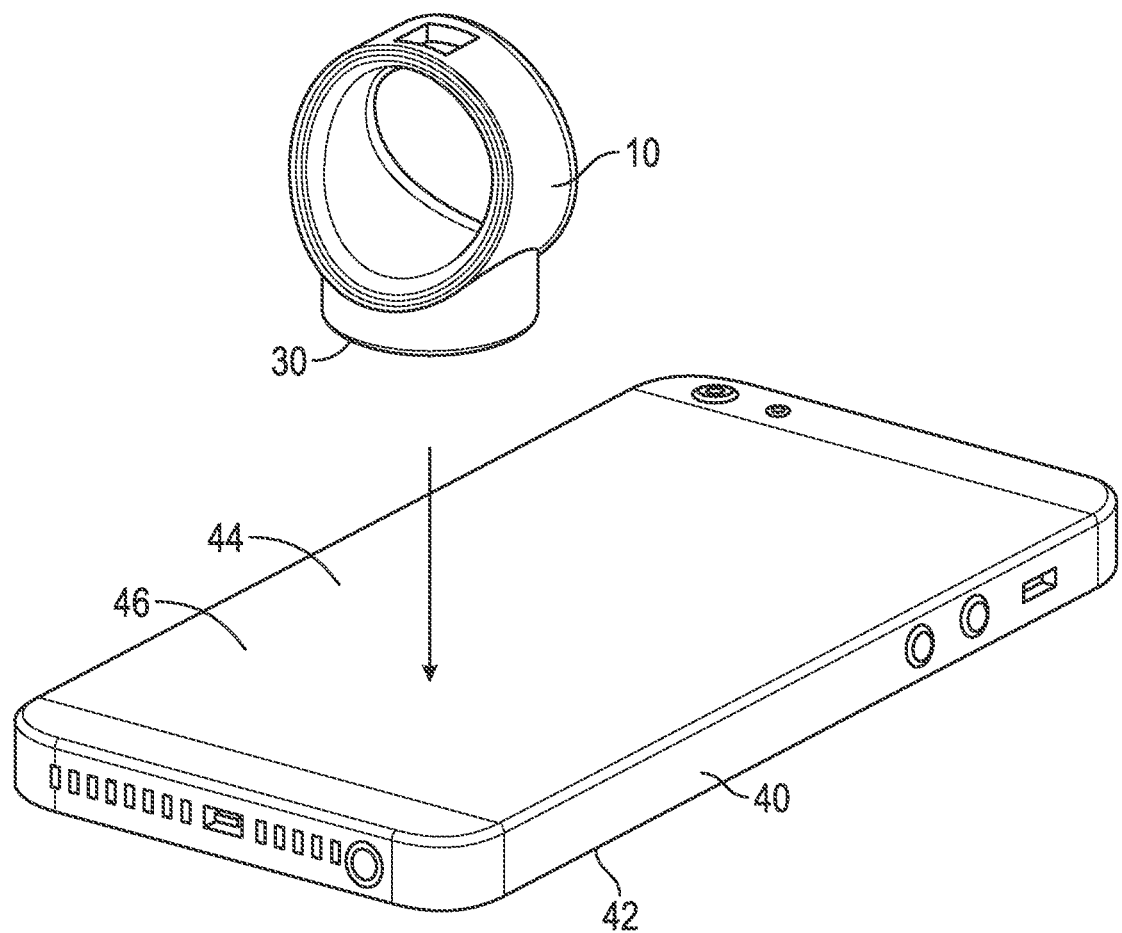
FIG. 2 is an exploded top perspective view of the article of jewelry of FIG. 1 shown secured to an outer surface of a handheld, mobile electronic device.

Referring now to FIG. 2, the article of jewelry 10 is shown with a handheld, mobile electronic device 40. The article of jewelry 10 is fitted with the magnet 30 as described above and shown in FIG. 1. Non-limiting examples of the handheld, mobile electronic device include cell phones, tablets, video devices, iPads, pagers, personal navigation devices, cameras and the like.

Referring again to FIG. 2, the handheld, mobile electronic device 40 includes a display surface 42 and a non-display (or rear surface) surface 44. The rear surface 44 forms a portion of an outer protective case 46. In the illustrated embodiment, the outer protective case 46 is formed from materials or combinations of materials that incorporate ferromagnetic metals. In other embodiments, the outer protective case 46 can include structures and/or features incorporating ferromagnetic metals. As described above, the ferromagnetic metals in the outer protective case 46 allows the magnet 30 to form a magnetic bond with and attach to the handheld, mobile electronic device 40 without the use of adhesives or structural attachment mechanisms.

While the embodiment of the handheld, mobile electronic device 40 shown in FIG. 2 is described above as having an outer protective case 46 formed from materials or combinations of materials that incorporate ferromagnetic metals, it is contemplated that in other embodiments, the handheld, mobile electronic device 40 can have other components and/or structures that incorporate ferromagnetic metals sufficient to allow the magnet 30 to form a magnetic bond with and attach to the handheld, mobile electronic device 40 without the use of adhesives or structural attachment mechanisms.

Figure 3:
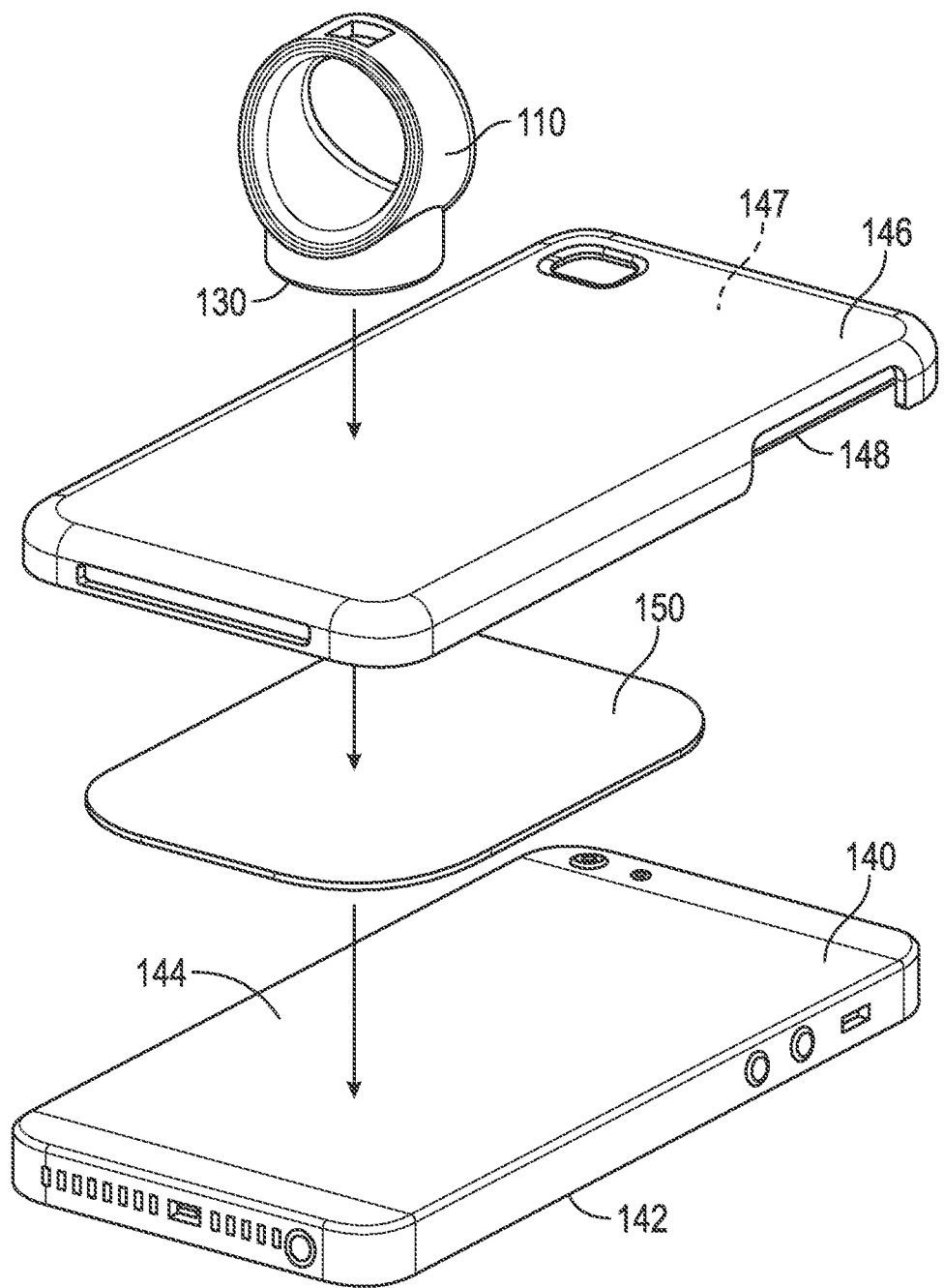
FIG. 3 is an exploded top perspective view of the article of jewelry of FIG. 1 shown with a ferromagnetic structure positioned between a non-display surface of a handheld, mobile electronic device and an interior surface of a protective case.

Referring now to FIG. 3, the article of jewelry 110 is shown with a second embodiment of a handheld, mobile electronic device 140. The article of jewelry 110 is fitted with the magnet 130 as described above and shown in FIG. 2. In the illustrated embodiment, the article of jewelry 110 is the same as, or similar to, the article of jewelry 10 described above and shown in FIGS. 1 and 2. In other embodiments, the article of jewelry 110 can be different from the article of jewelry 10.

Referring again to FIG. 3, the handheld, mobile electronic device 140 includes an outer protective case 146 that includes an interior cavity 148 configured to receive the handheld, mobile electronic device 140 in a manner such that a rear surface 144 of the handheld, mobile electronic device 40 is seated within the interior cavity 148 and against an interior surface 147 of the outer protective case 146.

Referring again to FIG. 3, prior to seating the handheld, mobile electronic device 140 in the cavity 148, a ferromagnetic structure 150 is positioned between the rear surface 144 of the handheld, mobile electronic device 140 and the interior surface 147 of the protective case 146. Once the handheld, mobile electronic device 140 is seated in the cavity 148, the ferromagnetic structure 150 remains positioned between the rear surface 144 of the handheld, mobile electronic device 140 and the interior surface 147 of the protective case 146.

In the embodiment illustrated in FIG. 3, the ferromagnetic structure 150 has the form of a thin sheet configured to easily fit between the rear surface 144 of the handheld, mobile electronic device 140 and the interior surface 147 of the protective case 146. In use with the article of jewelry 10 equipped with the magnet 30, the magnet 30 attracts itself to the ferromagnetic structure 150 while the user is holding the handheld, mobile electronic device 140. Advantageously, the combination of the article of jewelry 10 equipped with the magnet 30 and the ferromagnetic structure 150 positioned between the rear surface 144 of the handheld, mobile electronic device 140 and the interior surface 147 of the protective case 146 provides a more secure way to hold the handheld, mobile electronic device 140 and is a more streamlined aesthetic than products presently on the market.

Figure 4:
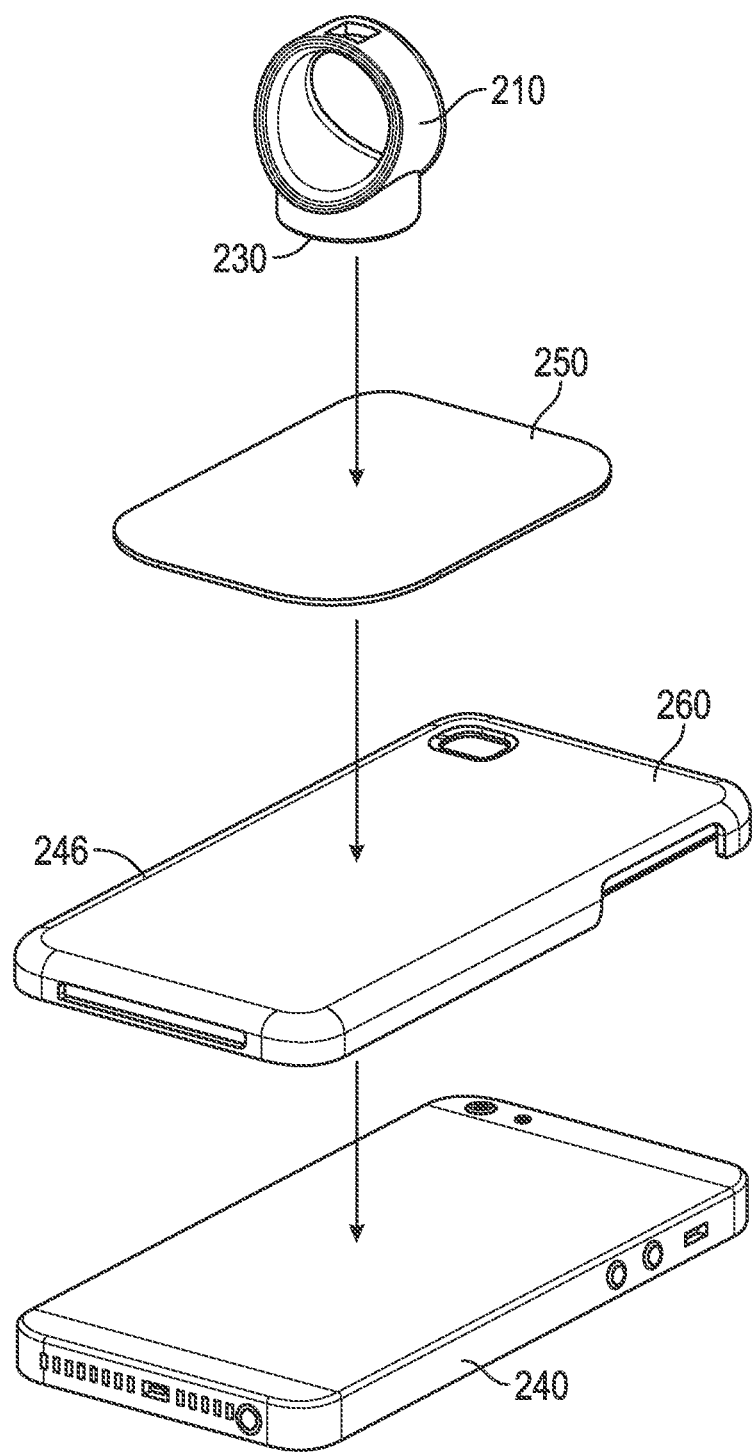
FIG. 4 is an exploded top perspective view of the article of jewelry of FIG. 1 shown with the ferromagnetic structure of FIG. 3 secured to an outer surface of the protective case of FIG. 2.

While the embodiment illustrated in FIG. 3 shows the article of jewelry 10 engaging the ferromagnetic structure 150 positioned between the rear surface 144 of the handheld, mobile electronic device 140 and the interior surface 147 of the protective case 146, it is contemplated that in other embodiments, the arrangement of the ferromagnetic structure 150 can be different. Referring now to FIG. 4 in a third embodiment, a ferromagnetic structure 250 is applied to an outer surface 260 of a protective case 246 of a handheld, mobile electronic device 240. Once the ferromagnetic structure 250 is secured to the handheld, mobile electronic device 240, the article of jewelry 210, having the magnet 230, attracts itself to the ferromagnetic structure 250 while the user is holding the handheld, mobile electronic device 240 in the same manner as described above.

Referring again to the embodiment shown in FIG. 4, the article of jewelry 210, ferromagnetic structure 250, the handheld, mobile electronic device 240 and the protective case 246 are the same as, or similar to, the article of jewelry 10, ferromagnetic structure 50, handheld, mobile electronic device 40 and the protective case 46 described above and shown in FIG. 3. However, in other embodiments, the article of jewelry 210, ferromagnetic structure 250, handheld, mobile electronic device 240 and the protective case 246 can be different from the article of jewelry 10, ferromagnetic structure 50, handheld, mobile electronic device 40 and the protective case 46.

Figure 5:
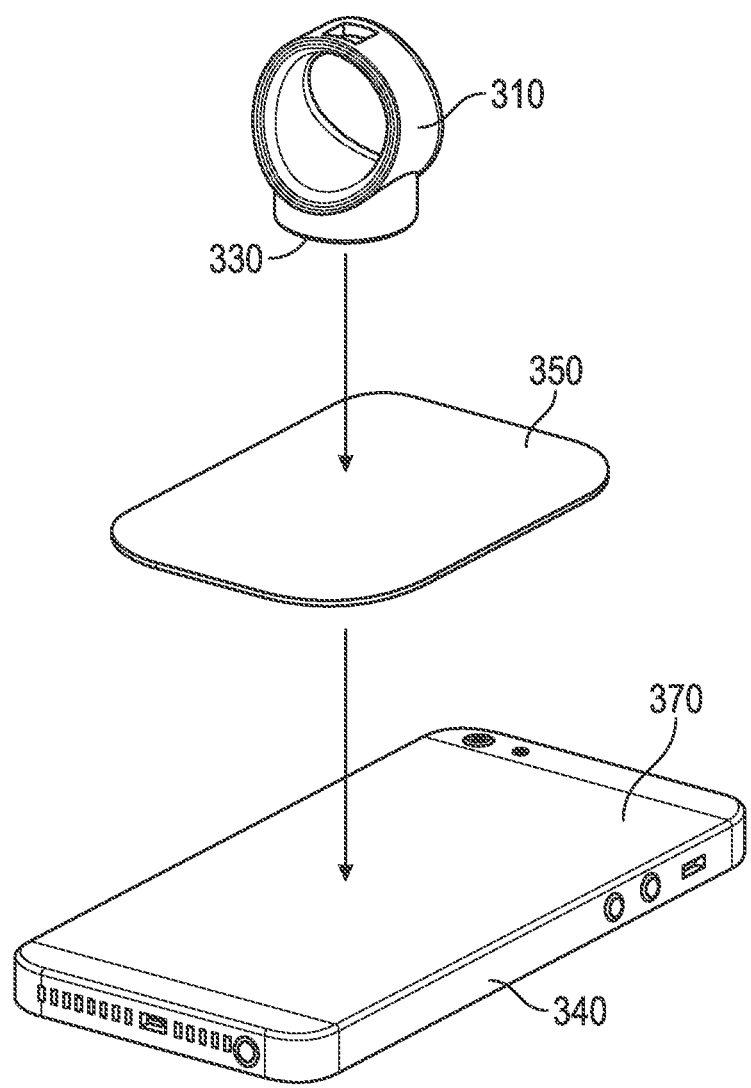
FIG. 5 is an exploded top perspective view of the article of jewelry of FIG. 1 shown with a ferromagnetic structure secured to an outer surface of a handheld, mobile electronic device.

Referring now to FIG. 5 in a fourth embodiment, a ferromagnetic structure 350 is applied to an outer surface 370 of a handheld, mobile electronic device 340. Once the ferromagnetic structure 350 is secured to the handheld, mobile electronic device 340, the article of jewelry 310, having the magnet 330, attracts itself to the ferromagnetic structure 350 while the user is holding the handheld, mobile electronic device 340 in the same manner as described above.

Referring again to the embodiment shown in FIG. 5, the article of jewelry 310, ferromagnetic structure 350 and the handheld, mobile electronic device 340 are the same as, or similar to, the article of jewelry 10, ferromagnetic structure 50, handheld, mobile electronic device 40 and the protective case 46 described above and shown in FIG. 3. However, in other embodiments, the article of jewelry 310, ferromagnetic structure 350 and the handheld, mobile electronic device 340 can be different from the article of jewelry 10, ferromagnetic structure 50, handheld, mobile electronic device 40 and the protective case 46.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A kit configured to secure an article of jewelry to a handheld, mobile electronic device with a protective outer case, the handheld, mobile electronic device having a rear surface and the protective outer case having an interior surface, the protective outer case being removably disposed on the handheld, mobile electronic device so that the rear surface is normally positioned adjacent the interior surface when the protective outer case is removably disposed on the handheld, mobile electronic device, the kit comprising:
an article of jewelry having
a shank configured to hold the article of jewelry on a finger of a user,
opposing shoulders extending from the shank,
a setting extending from the opposing shoulders, the setting having
a receptacle including a single circumferential wall including an outer rim, the receptacle formed from a ferromagnetic material,
a floor including floor features for receiving an adhesive, each of the floor features being a recess formed in the floor, and
a magnet positioned within the receptacle and secured in the receptacle with only the adhesive; and
a ferromagnetic structure configured to be associated with the handheld, mobile electronic device and configured for magnetic engagement through the protective outer case with the magnet of the article of jewelry, the ferromagnetic structure sized to be positioned without mounting, embedding, or attaching between the rear surface of the handheld, mobile electronic device and the interior surface of the protective outer case, the ferromagnetic structure having a thickness configured to permit the protective outer case to be removably disposed on the handheld, mobile electronic device when the ferromagnetic structure is positioned between the protective outer case and the handheld, mobile electronic device, the ferromagnetic structure configured to cover a major portion of the rear surface of the handheld, mobile electronic device;
wherein the magnet is configured to magnetically engage the ferromagnetic structure positioned without mounting, embedding, or attaching between the rear surface of the handheld, mobile electronic device and the interior surface of the protective case and through the protective outer case in a manner such as to secure the handheld, mobile electronic device to the finger of the user,
wherein the magnetic engagement occurs without the magnet and the ferromagnetic structure touching such that the magnet contacts only the protective outer case, and
wherein the outer rim is spaced apart from the floor at a distance and the magnet has a height, the distance and the height are the same.

2. The kit of claim 1, wherein the receptacle includes a circumferential wall and a floor that defines a cavity.

3. The kit of claim 2, wherein the magnet is positioned within the cavity.

4. The kit of claim 2, wherein the magnet has a height that is equal to or greater than a height of the cavity.

5. The kit of claim 1, wherein the magnet is bonded to a floor of the receptacle.

6. A method of securing an article of jewelry to a handheld, mobile electronic device with a protective outer case, the method comprising the steps of:
providing a kit configured to secure an article of jewelry to a handheld, mobile electronic device with a protective outer case, the handheld, mobile electronic device having a rear surface and the protective outer case having an interior surface, the protective outer case being removably disposed on the handheld, mobile electronic device so that the rear surface is normally positioned adjacent the interior surface when the protective outer case is removably disposed on the handheld, mobile electronic device, the kit including
an article of jewelry having
a shank configured to hold the article of jewelry on a finger of a user,
opposing shoulders extending from the shank,
a setting extending from the opposing shoulders, the setting having a receptacle including a single circumferential wall including an outer rim, the receptacle formed from a ferromagnetic material,
a floor including floor features for receiving an adhesive, each of the floor features being a recess formed in the floor, and
a magnet positioned within the receptacle and secured in the receptacle with only the adhesive; and
a ferromagnetic structure configured to be associated with the handheld, mobile electronic device and configured for magnetic engagement through the protective outer case with the magnet of the article of jewelry, the ferromagnetic structure sized to be positioned without mounting, embedding, or attaching between the rear surface of the handheld, mobile electronic device and the interior surface of the protective outer case, the ferromagnetic structure having a thickness configured to permit the protective outer case to be removably disposed on the handheld, mobile electronic device when the ferromagnetic structure is positioned between the protective outer case and the handheld, mobile electronic device, the ferromagnetic structure configured to cover a major portion of the rear surface of the handheld, mobile electronic device;
wherein the magnet is configured to magnetically engage the ferromagnetic structure positioned without mounting, embedding, or attaching between the rear surface of the handheld, mobile electronic device and the interior surface of the protective outer case and through the protective outer case in a manner such as to secure the handheld, mobile electronic device to the finger of the user,
wherein the magnetic engagement occurs without the magnet and the ferromagnetic structure touching such that the magnet contacts only the protective outer case, and
wherein the outer rim is spaced apart from the floor at a distance and the magnet has a height, the distance and the height are the same;
positioning the ferromagnetic structure adjacent one of the rear surface of the handheld, mobile electronic device and the interior surface of the protective outer case, the ferromagnetic structure configured for magnetic engagement with the magnet of the article of jewelry;
disposing the protective outer case on the handheld, mobile electronic device, the ferromagnetic structure covering the major portion of the rear surface of the handheld, mobile electronic device, whereby the ferromagnetic structure is secured, without mounting or embedding, between the protective outer case and the handheld, mobile electronic device so that the ferromagnetic structure is positioned between the protective outer case and the handheld, mobile electronic device;
engaging the ferromagnetic structure with the magnet of the article of jewelry through magnetic engagement in a manner such as to secure the handheld, mobile electronic device to the finger of the user.

7. The method of claim 6, including the steps of forming a cavity within the receptacle with a circumferential wall and a floor, and positioning the magnet within the cavity.

8. The method of claim 7, wherein the magnet has a height that equal to or greater than a height of the cavity.

9. The method of claim 6, including the step of attaching the ferromagnetic structure to a rear surface of the handheld, mobile electronic device.

10. The method of claim 6, including the step of attaching the ferromagnetic structure to a rear surface of a protective case enclosing the handheld, mobile electronic device.

11. The article of jewelry of claim 1, wherein the circumferential wall and the floor are each formed from ferromagnetic material to form a magnetic bond with the magnet.

12. The article of jewelry of claim 11, wherein the circumferential wall and the floor are each configured to form a magnetic bond with the magnet without the use of adhesives or structural attachment mechanisms.

13. The article of jewelry of claim 1, wherein the floor features configured as a member selected from a group consisting of depressions, projections, cross-hatchings, and combinations thereof.

14. The kit of claim 1, wherein the ferromagnetic structure has the form of a sheet material and is configured to be attached to a rear surface of the handheld, mobile electronic device or a rear surface of a protective case enclosing the handheld, mobile electronic device.

\* \* \* \* \*